United States Patent [19]

Pathmann

[11] 4,311,946
[45] Jan. 19, 1982

[54] ACTUATOR WITH ELECTRIC FEEDBACK SIGNAL

[75] Inventor: Charles E. Pathmann, Goodview, Minn.

[73] Assignee: Lake Center Industries, Winona, Minn.

[21] Appl. No.: 22,426

[22] Filed: Mar. 21, 1979

[51] Int. Cl.³ .............................................. G05B 1/06
[52] U.S. Cl. .................................................. 318/663
[58] Field of Search ............... 318/663, 664, 665, 666, 318/667; 338/76, 116

[56] References Cited

U.S. PATENT DOCUMENTS

| | | | |
|---|---|---|---|
| 2,294,210 | 8/1942 | Roters | 318/663 |
| 2,384,622 | 9/1945 | Isserstedt | 318/665 |
| 2,897,426 | 7/1959 | Hotine | 318/663 |
| 3,155,889 | 11/1964 | Stiles et al. | 318/664 |
| 3,551,791 | 12/1970 | Labude et al. | 338/76 |
| 4,054,825 | 10/1977 | Baxter | 318/663 |

Primary Examiner—J. V. Truhe
Assistant Examiner—Eugene S. Indyk
Attorney, Agent, or Firm—Kinzer, Plyer, Dorn & McEachran

[57] ABSTRACT

An actuator for use in the nature of a servomotor, having means for providing a signal indicative of the position of a mechanical linkage member. A feedback signal source voltage is alternately connected to a feedback signal lead by switch means which are carried by the mechanical linkage member of the actuator. Variable resistance means can be inserted between the voltage source and the feedback signal lead to provide a plurality of feedback signal voltages, each of which indicates a different position of the actuator linkage member.

4 Claims, 10 Drawing Figures

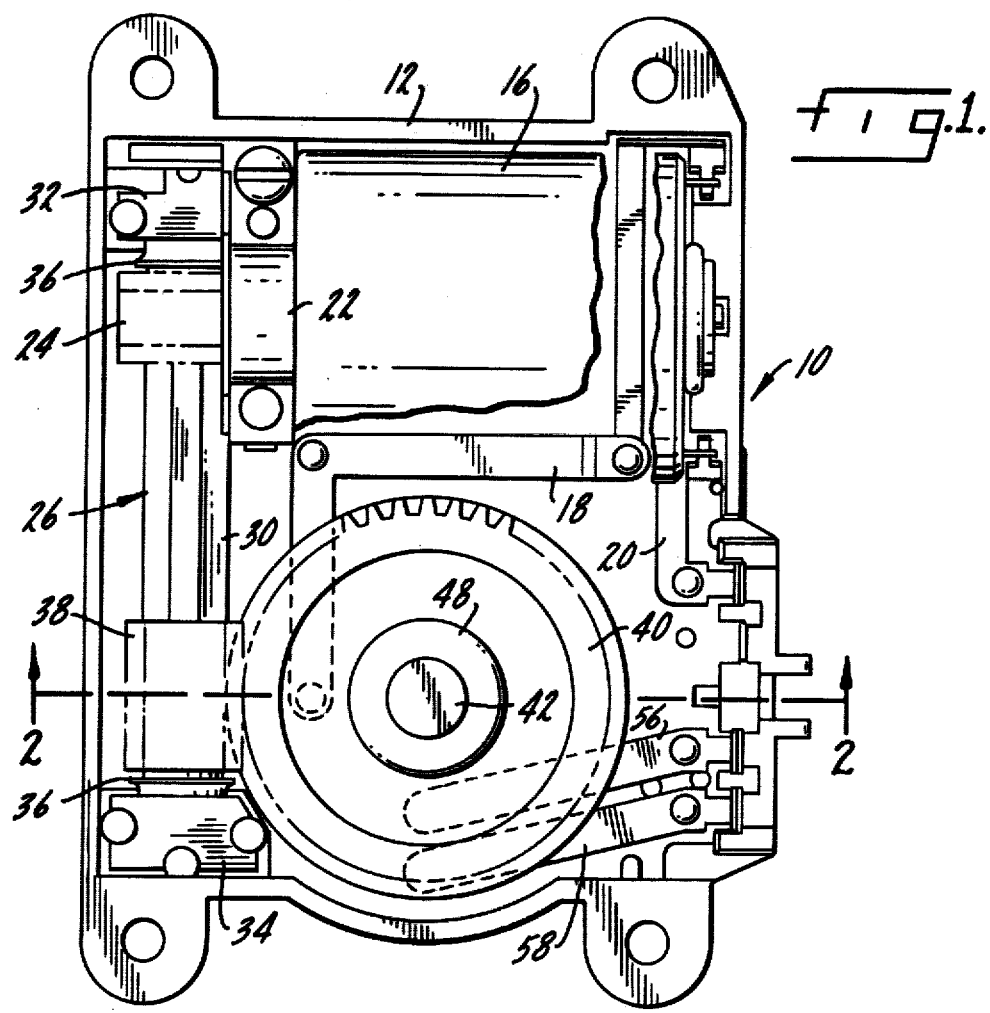
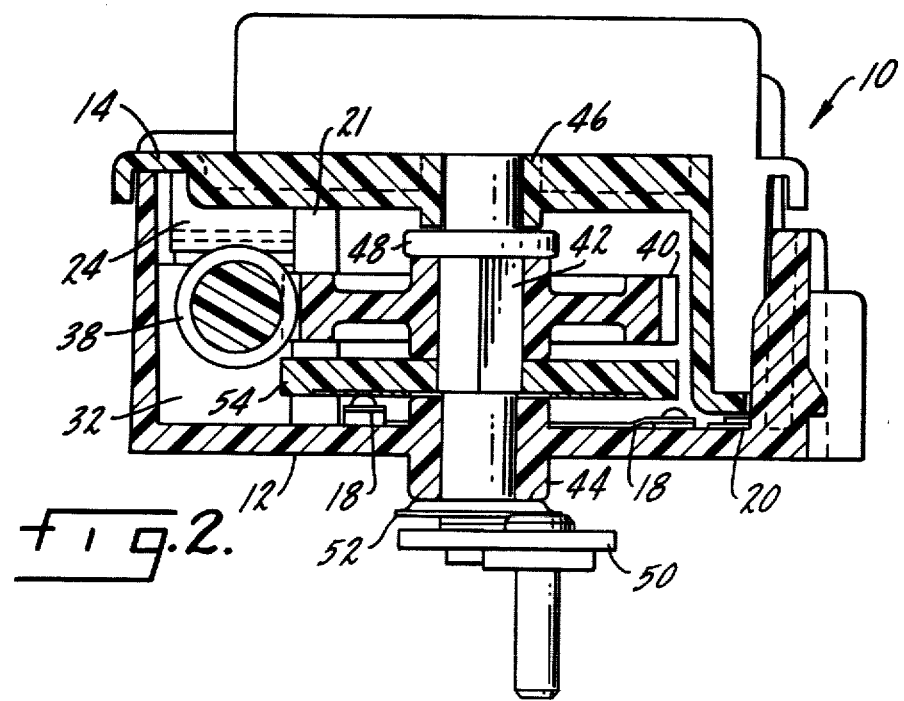

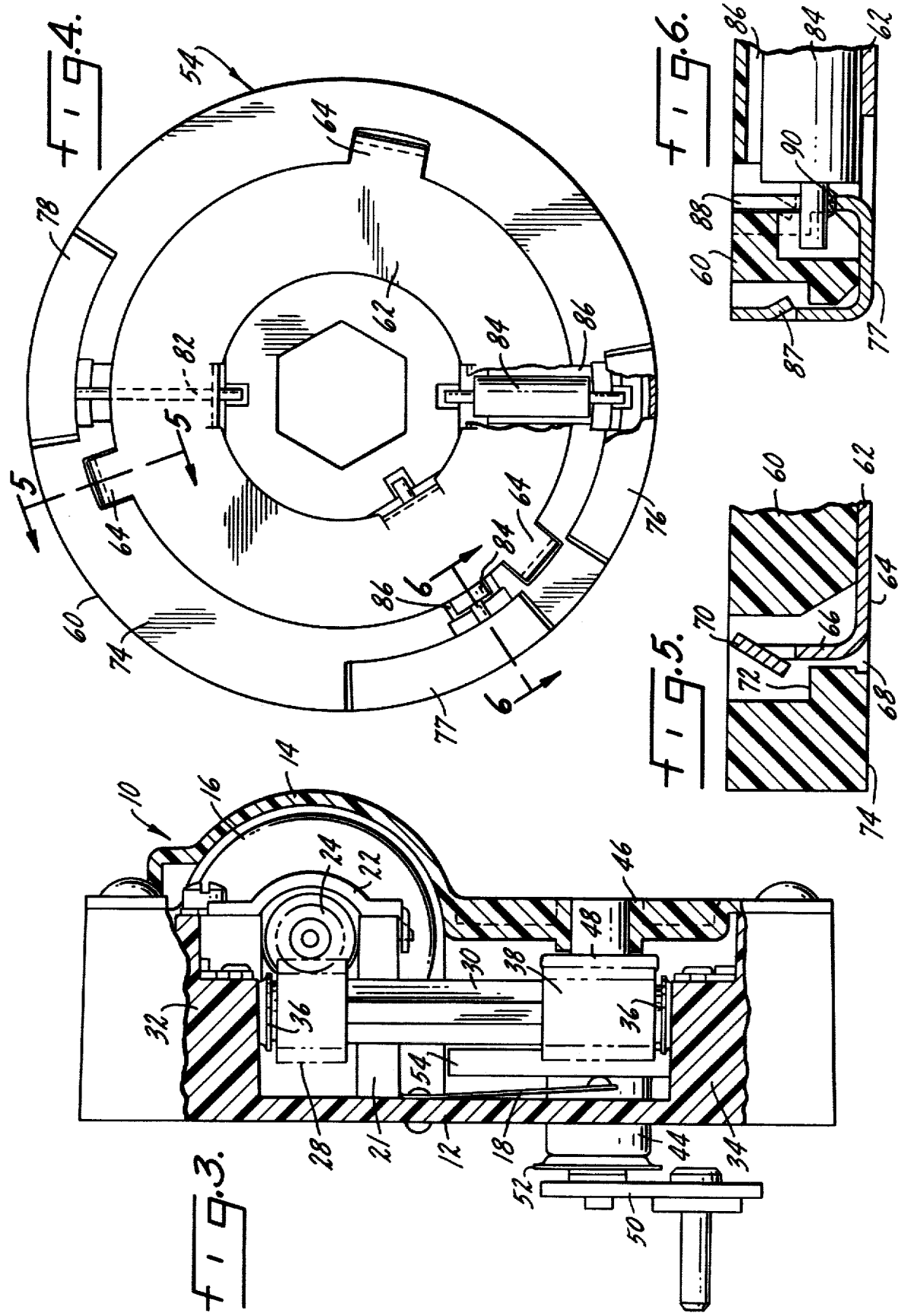

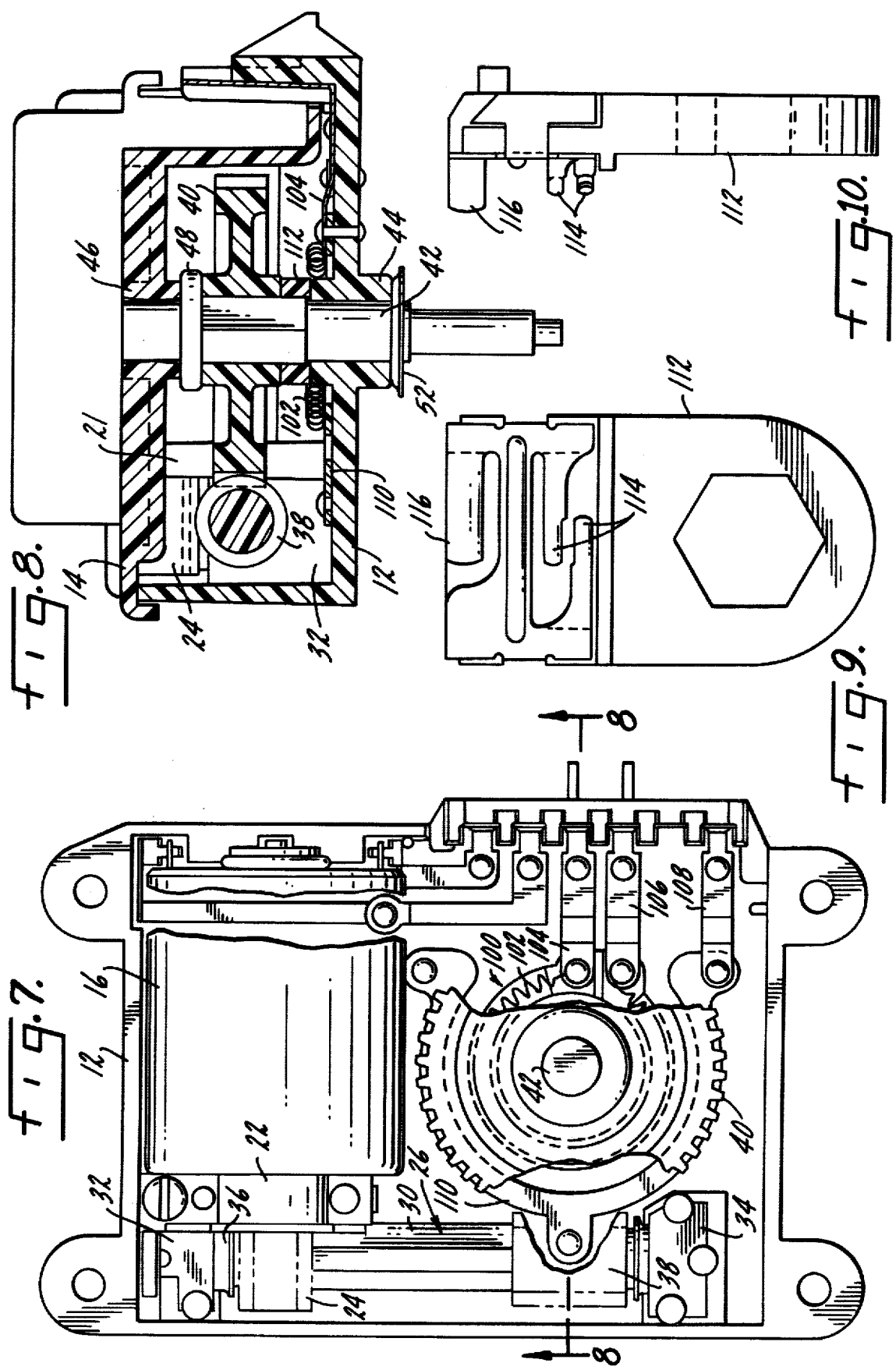

ACTUATOR WITH ELECTRIC FEEDBACK SIGNAL

SUMMARY OF THE INVENTION

This invention relates to electrically operated mechanical actuators, such as may be found in a servomechanism. Actuators of the type described are capable of use in general applications. They have been found to be particularly useful in operating louvers and doors in heating and ventilating systems. Actuators of such systems are turned on and off by a central control unit which relies on information from the actuator to properly position a plurality of ventilating doors to achieve the desired mode of operation.

The actuator of the present invention has been found particularly useful in automotive applications. The ventilating doors in automobile climate control systems have traditionally been operated by vacuum-powered actuators. The electrically operated actuator of the present invention eliminates the need for a vacuum power system and is reliably operable to quickly cause the desired amount of door movement in a vehicle climate control system.

One purpose of the invention is an actuator which generates a position feedback signal indicative of the location of the mechanical linkage member of the actuator.

Another purpose is a simply constructed, reliably operable actuator of the type described.

Another purpose is an actuator movable between positively controlled positions.

Another purpose is an actuator which uses the motor power supply to generate the feedback signal.

Another purpose is an actuator which will operate until a desired position is reached.

Another purpose is an actuator having a compact and simplified construction.

Other purposes will appear in the ensuing specification, drawings and claims.

BRIEF DESCRIPTION OF THE DRAWINGS

FIG. 1 is a top plan view of an actuator according to the present invention, with a portion of the housing removed and with parts cut away.

FIG. 2 is a section taken along line 2—2 of FIG. 1.

FIG. 3 is a side elevation view of the actuator.

FIG. 4 is a bottom plan view of the cam plate.

FIG. 5 is a section taken along line 5—5 of FIG. 4, showing the attachment for the first contactor strip.

FIG. 6 is a section taken along line 6—6 of FIG. 4, showing a portion of a bridge lead and the connection to the contactor strip.

FIG. 7 is a top plan view of an alternate embodiment of the present invention.

FIG. 8 is a section taken along line 8—8 of FIG. 7.

FIG. 9 is a top plan view of the switch means used in the alternate embodiment.

FIG. 10 is a side view of the switch means shown in FIG. 9.

DETAILED DESCRIPTION OF THE INVENTION

The actuator of the present invention is shown in FIGS. 1-3. The actuator is contained within a housing indicated generally at 10 which includes a casing 12 and a cover 14. The upper portion of the casing houses an electric motor 16. A power lead 18 and a ground lead 20 provide a circuit for supplying electric power to the motor 16. The leads can be connected through the housing 10 to an external power supply. A motor retainer 22 holds the motor 16 in position on a motor support 21.

A motor pinion 24 is connected to the motor shaft and is in driving relation with a gear means, indicated generally at 26. Gear means 26 includes a first worm 28 in mesh with the motor pinion 24. The first worm is mounted on the upper end of a jack shaft 30. The jack shaft is held in the casing 12 by upper and lower retainers 32 and 34 respectively. A pair of bushings 36 mounts the jack shaft for rotation in its retainers. The lower end of the jack shaft 30 carries a second worm 38. The second worm 38 is in turn in mesh with a bull gear 40. The bull gear is mounted on output shaft 42 and is the last gear in the gear means 26.

The output shaft 42 is mounted in a journal 44 in the casing and a journal 46 in the cover portion of the housing 10. A spacer 48 may be included to position the bull gear 40 on the shaft 42. At the point where the output shaft 42 extends through the casing 12 there is a mechanical linkage member 50 fastened to shaft 42. A retaining ring 52 aligns internal gear-means 26. This linkage may have whatever configuration required to effect the desired motion of the movable part.

Also mounted on the output shaft 42 is a switch means which comprises part of the feedback signal generating means. In a preferred embodiment this switch means is in the form of a cam plate 54, held between the bull gear 40 and the journal 44 at the bottom of the casing. A source lead 56 (FIG. 1) is in contact with the cam plate 54 and extends to a point where it protrudes through the casing 12 and is adapted to be connected to a voltage source external to the actuator. A feedback-signal lead 58, also in contact with the cam plate 54, lies adjacent to the source lead 56 and likewise is adapted to extend through the casing 12.

Details of the bottom surface of the cam plate are shown in FIGS. 4-6. The cam plate is made from a disc of insulating material which forms the base 60 of the structure. Overlying this base is a first contactor strip 62. This is made of an electrically conductive material. The first contactor strip is held on the cam plate by plurality of attachment elements 64. Details of this attachment element can be seen in FIG. 5. The attachment element includes a crimped portion 66 which extends into a receptacle 68 which is cut locally in the cam plate base 60. A tab 70 is provided in the crimped portions 66 for engagement with an abutment 72 to prevent the disengagement of the crimped portion from the receptacle.

The outer perimeter of the cam plate can be considered to be a second contactor strip 74. This is actually the portion of the cam plate base 60 outside of the first contactor strip 62. Since the cam base material is electrically non-conductive the second contactor strip can be considered to be electrically insulated from the first contactor strip. Included in the second contactor strip are conductive segments as at 76, 77 and 78. These are bands of conductive material placed on the second contactor strip. They are located in a slight depression 80 whose depth is approximately equal to the thickness of the conductive segment material.

Each of the conductive segments 76-78 is connected to the first contactor strip by a bridge lead such as that shown at 82. The bridge lead may be any sort of electrical connection between the conductive segment and the first contactor strip.

In a preferred embodiment, the bridge lead comprises a resistor such as that shown at 84 embedded in a trough 86 cut in the cam plate. The resistances may have a different value at each of the conductive segments. FIG. 6 shows the connection made between a conductive segment of the second contactor strip and the bridge lead. The conductive segment has a crimped portion and tab arrangement 87 similar to that of the first contactor strip. This fits over the outside edge of the cam plate. On the inside edge of the conductive patch there is another tab which fits down in the end of the trough 86 where it has a notch 88 for receiving the end of the resistor 84. The notch and resistor can be soldered as at 90 to assure positive connection. The opposite end of the resistor is similarly connected to the first contactor strip to complete the electrical connection between the inner and outer contactor strips.

The operation of the invention is as follows:

Power is supplied to the source lead 56 which is in contact with the first contactor strip 62. The power lead 18, also in contact with the inner strip 62 supplies the source voltage to the motor 16. The motor circuit is completed by the ground contact 20. When power is supplied to the source lead 56, the motor pinion 24 turns, causing the jack shaft 30 to rotate, carrying with it the worm 38. This rotation causes the bull gear 40 to rotate, which in turn moves the mechanical linkage member 50 on the output shaft 42. The output shaft will continue to rotate until power to the source lead 56 is shut off.

When power is supplied to the source lead 56 that voltage is present all around the first contactor strip 62. By virtue of the bridge leads 82 the voltage is also present on each of the conductive segments of the second contactor strip. As the cam plate 54 rotates with the output shaft 42 the conductive segments will alternately come into contact with the feedback signal lead 58. When the feedback signal lead 58 is in contact with any of the conductive segments, a voltage will appear on the lead 58 which then can be fed to external circuitry for processing as required. For example, a voltage divider could be connected to the signal lead 58 which would supply an output voltage whose value would depend on the value of the resistance in the bridge lead 82. Thus if each of the resistances in the bridge leads is different, sensing a certain output voltage would be indicative of a certain conductive segment being in contact with the feedback signal lead. In some instances it may not be necessary to have different bridge lead resistances. The feedback signal could be any voltage regardless of the value. That is, the external control system may be satisfied to locate the cam plate, and in turn the linkage arm 50, in any position where a feedback voltage is created. It will be noted that if the cam plate is so located that the feedback signal lead 58 is not in contact with a conductive segment of the second contactor strip, then no feedback signal will be present.

It will be readily appreciated that the number and width of conductive segments of the second contactor strip may be other than as shown. For example, where precision positioning is required the conductive segments may be narrower than those shown in the figure. Also, the number of positions that will generate a feedback signal can be as great as space limitations will permit.

One of the advantages of the present inventions is the use of the source lead to supply the power for the feedback signal. With this arrangement no extra power input is needed. Also while the power lead 18 has been shown engaging the contactor strip 62 it need not be so. The power lead could be connected directly to the right hand end of the source lead 56.

An alternate embodiment of the present invention is shown in FIGS. 7 and 8. This embodiment includes many features common to the above-described actuator and description of these elements will not be repeated. The alternate embodiment includes a variant form of the feedback signal generating means. This is comprised of a potentiometer indicated generally at 100. The potentiometer includes a primary coil 102 connected to a pair of leads 104 and 106. These leads are adapted to be connected to an external power supply. The feedback signal lead 108 is connected to a wiper bus 110. A wiper arm 112 is mounted for a rotation on the output shaft 42. As seen in FIG. 9 and 10, the wiper arm has a set of pick up contacts 114 and 116 which are in continuous contact with the coil 102 and the wiper bus 110 respectively. Thus, when a voltage is provided across leads 104 and 106, a portion of that voltage appears on the wiper bus 110 by virtue of the connection of the bus to the resistance coil 102 by a wiper arm 112. The value of the voltage on the wiper bus depends on the location of the wiper arm on resistance coil 102. As the wiper arm moves with the output shaft, a continuously varying voltage appears on the bus 110. This becomes a varying feedback signal at the lead 108. This provides a continuous position feedback signal and enables an external control system to maintain constant surveillance of the position of an actuated part.

It will be realized that whereas a practical and operative device has been shown and described, nevertheless, many changes may be made in size, shape and disposition of parts without departing from the spirit and scope of the invention. It is therefore desired that the description and drawings be taken in a broad sense as illustrative rather than as limiting the invention to the specific showing.

The embodiments of the invention in which an exclusive property or privilege is claimed are defined as follows:

1. In an actuator of the type having a housing, an electric motor mounted in the housing, power and ground leads providing a circuit for supplying electric power to the motor, an output shaft, gear means in driving relation with the motor for driving the output shaft, the improvement comprising a position feedback-signal generating means including:

a feedback-signal lead;

a source lead adapted to be connected to a voltage source for the feedback-signal;

a cam plate mounted for movement with the output shaft;

a first contactor strip made of a continuous, electrically conductive material, mounted on the cam plate, with the source lead in contact therewith;

a second contactor strip, electrically insulated from the first contactor strip, mounted on the cam plate and having intermittent conductive segments interspersed in a non-conductive portion, with the feedback-signal lead in contact therewith;

bridge leads, including resistance means, connecting the conductive segments of the second contactor strip to the first contactor strip so that when a conductive segment is contacted by the feedback-signal lead a feedback-signal is generated.

2. The actuator of claim 1 wherein the power lead of the motor and the source lead for the feedback signal are adapted to be connected to a single common power supply.

3. The actuator of claim 1 wherein each resistance has a value distinct from all the others so that a separate feedback signal is generated through each of the resistors.

4. The actuator of claim 1 wherein the cam plate is made of a disc of insulating material with the first and second contactor strips attached to one surface of the disc and the bridge leads are located in troughs underneath the contactor strips.

* * * * *